UNITED STATES PATENT OFFICE 2,612,765

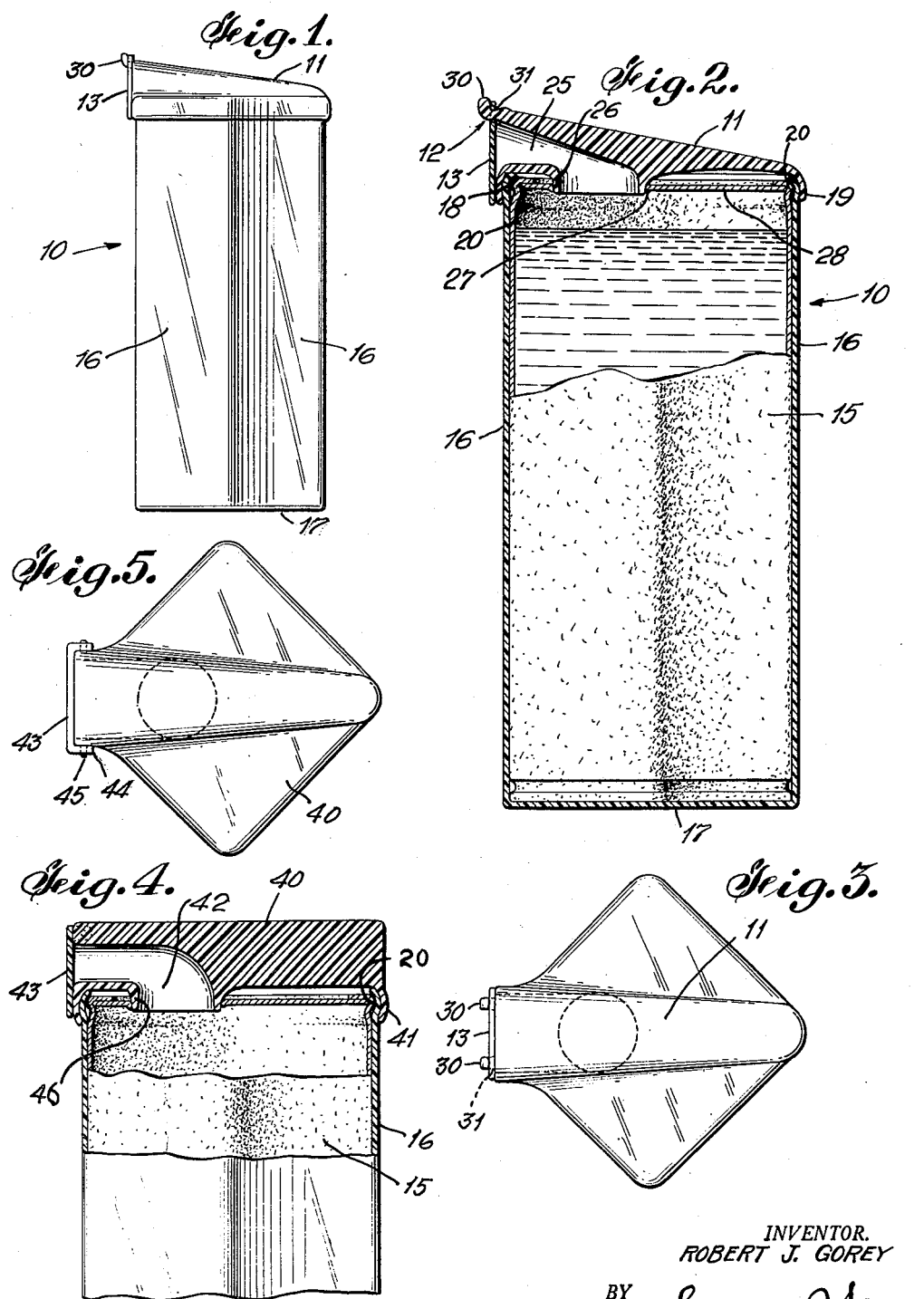

COMBINATION PITCHER AND CONTAINER FOR PAPER MILK CONTAINERS

Robert J. Gorey, Elmhurst, N. Y.

Application October 31, 1949, Serial No. 124,670

1 Claim. (Cl. 65—61)

This invention relates to a combination pitcher and container for paper milk containers.

The principal object of this invention is the provision of a combination pitcher and container for conventional square paper milk containers. It serves as a container which is adapted to receive and hold a conventional paper milk container; it also serves as a pitcher for the milk which said conventional paper milk container contains.

It is a common practice in many homes to make use of a milk pitcher at the table, for the purpose of pouring milk into cups of coffee, bowls of cereal, and the like. The milk is purchased at the store, or it may be delivered by the milkman, in conventional paper containers and it is poured into the pitcher for table use. Frequently, unused milk is poured back into the paper container and then stored away in the refrigerator for use at a subsequent time. In some households the unused milk is allowed to remain in the pitcher which is then placed in the refrigerator until it is again needed. Occasionally both the paper container and the pitcher contain unused milk and both occupy valuable space in the refrigerator concurrently.

In other homes the paper milk container is itself used at the table and milk is poured therefrom directly into the coffee cups and cereal bowls and the like. In these homes the paper milk container is placed on the table in precisely the same condition in which it is received from the storekeeper or milkman.

Both practices are disadvantageous in many respects. Referring in the first place to the use of milk pitchers at the table, it will be seen that this practice is wasteful of time and effort. It is necessary to wash and clean the pitcher both before and after use. It is necessary to pour the milk into the pitcher and then, very frequently, to pour some of the milk back into the paper container. When the unused milk is allowed to remain in the pitcher, the milk becomes foul in the refrigerator since the pitcher does not normally provide adequate protection against contamination from the many food odors which generally pervade the confined air of refrigerators. Milk pitchers as a class are normally extremely wasteful of valuable refrigerator space and when the paper milk container retains some milk and the pitcher contains an additional quantity of milk, and both occupy the refrigerator at the same time, there is that much more waste of space. Another disadvantage in utilizing a conventional milk pitcher for storing milk in the refrigerator is that the milk pitcher is normally uncovered and little or no protection is afforded against foreign matter falling therein as, for example, when another shelf, containing other objects, is disposed above the shelf which supports the pitcher.

When the paper milk container is brought to the table, its outer surface is invariably unclean and unsanitary. The mere fact that it is placed upon the same table surface on which such articles of food as bread and rolls are placed, is sufficient to contaminate the bread and rolls. Aside from the fact that this is an unsanitary procedure, it is also an unsightly practice which detracts from the appearance of the table.

The device which is herein claimed comprises a container for the paper milk container and a pitcher for its milk. It is adapted to accommodate the milk container as a whole and thereby to enclose and conceal it. It is provided with a pouring spout which communicates with the inside of the milk container and through which the milk may be poured directly from the milk container to the dish or cup in which it is to be consumed. The pouring spout may be provided with a hinged closure member to avoid contamination of the milk in the refrigerator. This combination container and pitcher may be placed on and used at the table as though it were a conventional milk pitcher. Without any change or modification whatsoever it may be placed in the refrigerator with any unused quantity of milk that the paper milk container mounted therein may contain. And then without any additional attention or preparation of any kind it may be removed from the refrigerator and placed upon the table for continued use at any subsequent time.

In the preferred form of this invention there are three component parts: the container proper which is adapted to receive the milk container, a cover for said container proper which includes a spout that communicates with the inside of the milk container, and a closure for said spout. It is preferred that these three component parts of the device be made of suitable plastics but it will also be understood that other materials, such as aluminum, may also be used to good advantage.

Preferred forms of this invention are shown in the drawing, in which:

Fig. 1 is a side view, and more precisely a corner view, of a combination pitcher and container for paper milk containers made in accordance with the first form of this invention.

Fig. 2 is a vertical section therethrough on an enlarged scale, showing how a paper milk container is mounted therein.

Fig. 3 is a top view thereof.

Fig. 4 is a fragmentary view, somewhat similar to that of Fig. 2, of a combination pitcher and container made in accordance with a second form of this invention.

Fig. 5 is a top view of said modified combination pitcher and container.

The combination pitcher and container for paper milk containers which illustrates the first form of this invention comprises a container 10, a cover 11 for said container which has a pouring spout 12, and a hinged closure 13 for said pouring spout. Container 10 corresponds, substantially, to a conventional square paper milk container 15, in shape, and it is slightly larger in size. Paper milk containers are conventional in size and shape and the inside dimensions of container 10 are such as to enable the container to accommodate a conventional paper milk container. In order words, container 10 has four substantially identical side walls 16 and a floor 17. Along their upper edges, walls 16 are provided with concavo-convex beads 18 which may or may not extend along the full width of all of said side walls 16. More specifically, beads 18 are concave along their inner surfaces and they are convex along their outer surfaces. The top edges of said beads may extend inwardly inside of walls 16.

Cover 11 also has concavo-convex beads 19 formed along its lower edges and it will be noted that the inner surfaces of said beads 19 are concave and their outer surfaces are convex. Beads 19 are adapted to snap over beads 18 in order to attach cover 11 to container 10. By the same token beads 19 may be snapped off beads 18 to to remove the cover from said container. It will be noted that it is the convex or outer side of beads 18 that engages or is engaged by the concave or inner side of beads 19.

The inner or concave side of beads 18 also performs an important function. It will be noted that conventional paper milk container 15 is provided with a bead 20 along each of its four top edges. This bead tends to project outwardly from the side walls of the paper milk container and when said paper milk container is placed in container 10, its said beads 20 engage or are engaged by the concave inner side of beads 18. Interengagement between beads 18 and 20 is assured by virtue of the fact that the upper edges of beads 18 project inwardly relative to the side walls 16 of container 10. It is this interengagement of bead 18 with beads 20 that locks container 15 in container 10.

It will be seen from the foregoing that beads 19 of cover 11 and beads 20 of the paper milk container both engage or are engaged by beads 18 of container 10. Said beads 18 are therefore adapted to perform two functions: to hold the paper milk container in container 10 and to hold the cover 11 on said container 10.

It will be noted in the drawing that a passageway 25 is formed in cover 11 and that said passageway provides communication between pouring spout 12 and the inside of the paper milk container 15. A ring-shaped projection 26 is formed at the bottom of cover 11 and it will be noted that said ring and more specifically the wall of said ring is somewhat wedge-shaped in cross section. This ring-shaped projection is adapted to enter opening 27 in top wall 28 of the paper milk container. The wedge-shaped wall of said ring-shaped projection enables it to wedge or jam down tightly into said opening 27 in the top wall of the paper milk container. A leak-proof seal is thereby provided between the cover 11 on the one hand and the paper milk container 15 on the other hand and a leak-proof passage is thereby provided between said paper milk container on the one hand and the spout 12 of cover 11 on the other hand.

Cover 11 is provided with a pair of horns or lugs 30 which project upwardly at spout 12. Closure 13 has a pair of openings 31 formed therein to accommodate horns or lugs 30. In other words, closure member 13 is simply a handing plate which may be hung from horns or lugs 30 in the manner shown and described. Gravity will tend to pull hanging plate 13 downwardly to closed position relative to spout opening 12. When the unit is tilted, however, to pour milk out of the inner container, said hanging plate will swing forwardly, automatically, to open the spout opening. It is very readily removable from cover 11 for cleaning and other purposes.

The form of invention shown in Figs. 4 and 5 differs from the form of invention first above described only insofar as the cover and closure members are concerned. The container proper which receives the paper milk container remains unchanged. More specifically, a cover 40 is provided which corresponds to cover 11. It has downwardy extending flanges 41 which are provided with concave inner faces and hence it will be understood that these flanges 41 correspond to flanges or beads 19 of the first form of this invention. These downwardly extending flanges 41 are adapted to engage beads 18 of container 16 and it will be seen that the inner concave faces of said flanges 41 complement the outer convex faces of beads 18. By the same token, the inner concave faces of beads 18 of the outer container are adapted to engage the outer convex faces of beads 20 of the inner paper milk container. Again it will be seen that beads 18 of the outer container 16 perform the dual function of locking the paper milk container in place in said outer container and the cover member in place on top of said outer container. The very fact that the same beads hold both the milk container and the cover in place assures proper alignment and positioning of the ring-shaped projection at the inlet end of the spout passageway and the opening in the top of the paper milk container. It will be seen in Fig. 4 that cover 40 has a spout passageway 42 corresponding to spout passageway 25 of the first form of this invention and a downwardly extending, ring-shaped projection 46 at the inlet end of said spout passageway corresponding to ring-shaped projection 26 above mentioned.

A closure 43 is provided at the spout opening of cover 40 corresponding to closure 13 of the first form of this invention. It will be noted that closure 43 also constitutes a hanging plate which is normally held in closed position relative to the spout opening by reason of the attraction of gravity thereon. It has a pair of arms 44 which are pivotally connected to cover 40 by means of pins 45. It is by means of these arms and upon said pins that the hanging plate is adapted to swing into open or closed position relative to the spout opening.

It will be understood that the foregoing is descriptive of preferred forms of this invention and that these preferred forms may be modified in many ways within the broad scope and coverage of the invention. For example, although the invention has been described in terms of its application to a paper milk container, actually it may be applied to other containers equally as well, a paper cream container of considerably smaller size than conventional paper milk containers, being illustrative.

I claim:

A combination pitcher and outer container for paper milk containers and the like, comprising an outer container which is of substantially rectangular shape to accommodate a correspondingly rectangular paper milk container having a hole in its top wall and an outwardly extending bead formed along the top of its side wall, a cover for said outer container having a spout and spout passageway with a downwardly extending neck formed therein for communication with the paper milk container through the opening in the top wall thereof, and having a hinged closure member at said spout and spout passageway, said cover being provided with a concave, downwardly extending flange, and said outer container being provided with a concavo-convex upwardly extending flange which is adapted to engage the downwardly extending flange of the cover to hold said cover in place on said outer container, said concavo-convex flange being also adapted to engage the bead on the paper milk container to hold said paper milk container in place in said outer container, the downwardly extending neck of the spout passageway projecting downwardly into the hole in the top wall of the paper milk container and engaging said top wall along the edge surrounding said hole to form a liquid-tight seal therewith.

ROBERT J. GOREY.

REFERENCES CITED

The following references are of record in the file of this patent:

UNITED STATES PATENTS

| Number | Name | Date |
|---|---|---|
| 618,782 | Cameron, Jr. | Jan. 31, 1899 |
| 1,411,542 | Van Orsdale | Apr. 4, 1922 |
| 1,824,290 | Miller | Sept. 22, 1931 |
| 1,927,553 | Lusher | Sept. 19, 1933 |
| 1,935,969 | Witherspoon | Nov. 21, 1933 |
| 1,946,895 | Brooker | Feb. 13, 1934 |
| 1,955,610 | Seipt | Apr. 17, 1934 |
| 2,004,852 | Coyle | June 11, 1935 |
| 2,025,796 | Waldheim | Dec. 31, 1935 |
| 2,089,958 | Hothersall | Aug. 17, 1937 |
| 2,144,155 | Jahnke et al. | Jan. 17, 1939 |
| 2,184,397 | Nelson | Dec. 26, 1940 |
| 2,345,971 | Hamilton et al. | Apr. 4, 1944 |